United States Patent [19]

Perego

[11] 4,324,410
[45] Apr. 13, 1982

[54] COLLAPSIBLE PERAMBULATOR COT FRAME STRUCTURE INCLUDING TELESCOPIC SIDE MEMBERS

[76] Inventor: Guiseppe Perego, Via De Gasperi, Arcore (Milano), Italy, 20043

[21] Appl. No.: 117,096

[22] Filed: Jan. 31, 1980

[30] Foreign Application Priority Data

Aug. 9, 1979 [IT] Italy .............................. 22324/79[U]

[51] Int. Cl.³ .......................................... B62B 11/00
[52] U.S. Cl. ................................... 280/42; 280/642; 280/649; 280/650
[58] Field of Search ................ 280/42, 649, 650, 647, 280/648, 642, 644, 643, 657, 658, 641, 38, 639, 638

[56] References Cited

U.S. PATENT DOCUMENTS

| | | | |
|---|---|---|---|
| 1,576,075 | 3/1926 | Tisdell | 280/643 |
| 2,590,761 | 3/1952 | Edgar | 308/237 A |
| 2,797,102 | 6/1957 | Adams | 280/641 X |
| 3,222,081 | 12/1965 | Harmon, Jr. | 280/649 X |
| 3,961,853 | 6/1976 | Fagel | 105/168 X |
| 4,019,757 | 4/1977 | Beger et al. | 280/649 |
| 4,077,640 | 3/1978 | Perego | 280/42 |

FOREIGN PATENT DOCUMENTS

| | | | |
|---|---|---|---|
| 2346194 | 10/1977 | France | 105/176 |
| 257798 | 9/1926 | United Kingdom | 280/650 |
| 461980 | 2/1937 | United Kingdom | 105/176 |
| 827972 | 3/1960 | United Kingdom | 105/176 |
| 838936 | 6/1960 | United Kingdom | 105/176 |

*Primary Examiner*—Joseph F. Peters, Jr.
*Assistant Examiner*—Milton L. Smith
*Attorney, Agent, or Firm*—McGlew and Tuttle

[57] ABSTRACT

A collapsible perambulator cot which is adapted to fold between an operative and inoperative position which includes in addition to opposed folding side cross-struts, a bottom or base cross-struts which have the respective lower ends hinged to the rear folding legs of the frame. The structure includes further telescopingly associated elements of rectangular cross-section paired and arranged to form strengthening side elements connecting the outer ends of the cross-struts, the telescoped arrangement allowing folding of the perambulator.

5 Claims, 4 Drawing Figures

4,324,410

COLLAPSIBLE PERAMBULATOR COT FRAME STRUCTURE INCLUDING TELESCOPIC SIDE MEMBERS

BACKGROUND OF THE INVENTION

The present invention relates to a perambulator cot support frame, more particularly to a frame of a perambulator cot of the collapsible or foldable type, allowing the perambulator to be immediately folded into a minimum space whenever necessary or expedient for facilitating transportation.

THE PRIOR ART

Foldable perambulator frames are known and produced in various forms. A particularly improved frame structure for supporting a foldable perambulator has been detailedly disclosed in the U.S. Pat. No. 4,077,640 granted to me on Mar. 7, 1978, and which is hereby incorporated by reference.

The known foldable frame support includes a pair of opposed side cross-struts each including a front leg and a rear leg of the frame. Pivot means interconnect the rear leg and the corresponding front leg intermediate the ends thereof. An arm member is provided which is pivotally connected to the upper end portion of the respective front legs.

The known frame further includes a base cross-strut having crossing arm struts pivoted together intermediate the ends thereof, and means for pivoting the opposed ends of the respective arm struts of said base cross-strut to the lower end portion of diagonally disposed front and rear legs. Other details and structural combination have been set forth and illustrated in U.S. Pat. No. 4,077,640.

OBJECT OF THE INVENTION

It is an object of the present invention to improve the structural resistance of the frame and thus provide a collapsible type perambulator cot that is best adapted to resist severe and extended abuse.

SUMMARY OF THE INVENTION

Principally, according to the present invention side elements interconnecting the side ends of the base cross-struts are provided for strengthening the structure. In order to allow folding of the support structure and complete perambulator, said side members are made of telescopingly associated elements.

Preferably, the telescopingly associated elements have a rectangular cross-section, and each one joins a front end to a rear end of the base-cross struts by means of the inner and outer elements of the telescope respectively. The front lower ends of the side cross-struts are fixed to the inner elements of the side members, and the opposite rear ends of said side cross-struts are fixed to the outer elements of the abovesaid side members. In this way, they cause the telescoping, either inwardly or outwardly, of the side members during the folding of the chassis or when the chassis is put back into working position.

In turn, the axles of the front wheels are also fixed to the inner elements of these side members. The axles of the rear wheels are fixed to other small tube-shaped elements, having a rectangular cross-section, that have their ends fixed laterally and internally to the outer elements of the abovementioned side members by means of suitable rods and vertical springs through which a pin passes. These springs act as true suspensions.

The above characteristics and others of lesser importance will be evident from the description given hereinafter with reference to the accompanying drawings which, by way of non-limiting example illustrate a preferred embodiment of the foldable support frame for the cot of a children's perambulator, according to the present invention.

DETAILED DESCRIPTION OF THE PREFERRED EMBODIMENT

The new features of the invention will be best understood upon a consideration of the structure components and combination of components essentially corresponding to those set forth in the U.S. Pat. No. 4,077,640.

Figure 1:
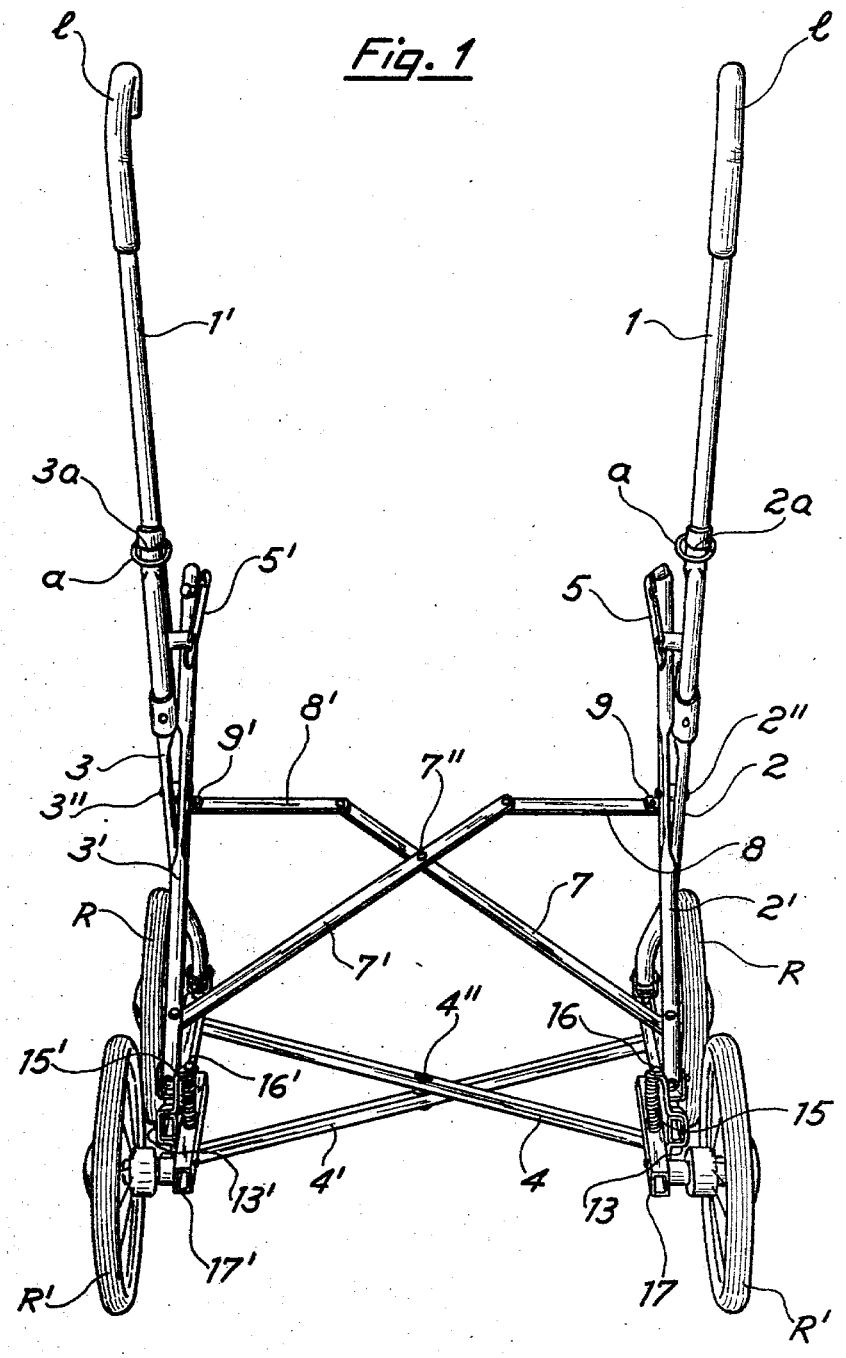
FIG. 1 is a rear perspective view of the chassis made in accordance with the invention in the working position.

As can be seen from the drawings, in FIG. 1, the frame or chassis of the perambulator includes two arms 1, 1', two side cross struts 2, 2' and 3, 3', a base-cross strut 4, 4', and two horizontal rods 5,5' for the fixing of a cot (not shown).

Figure 2:
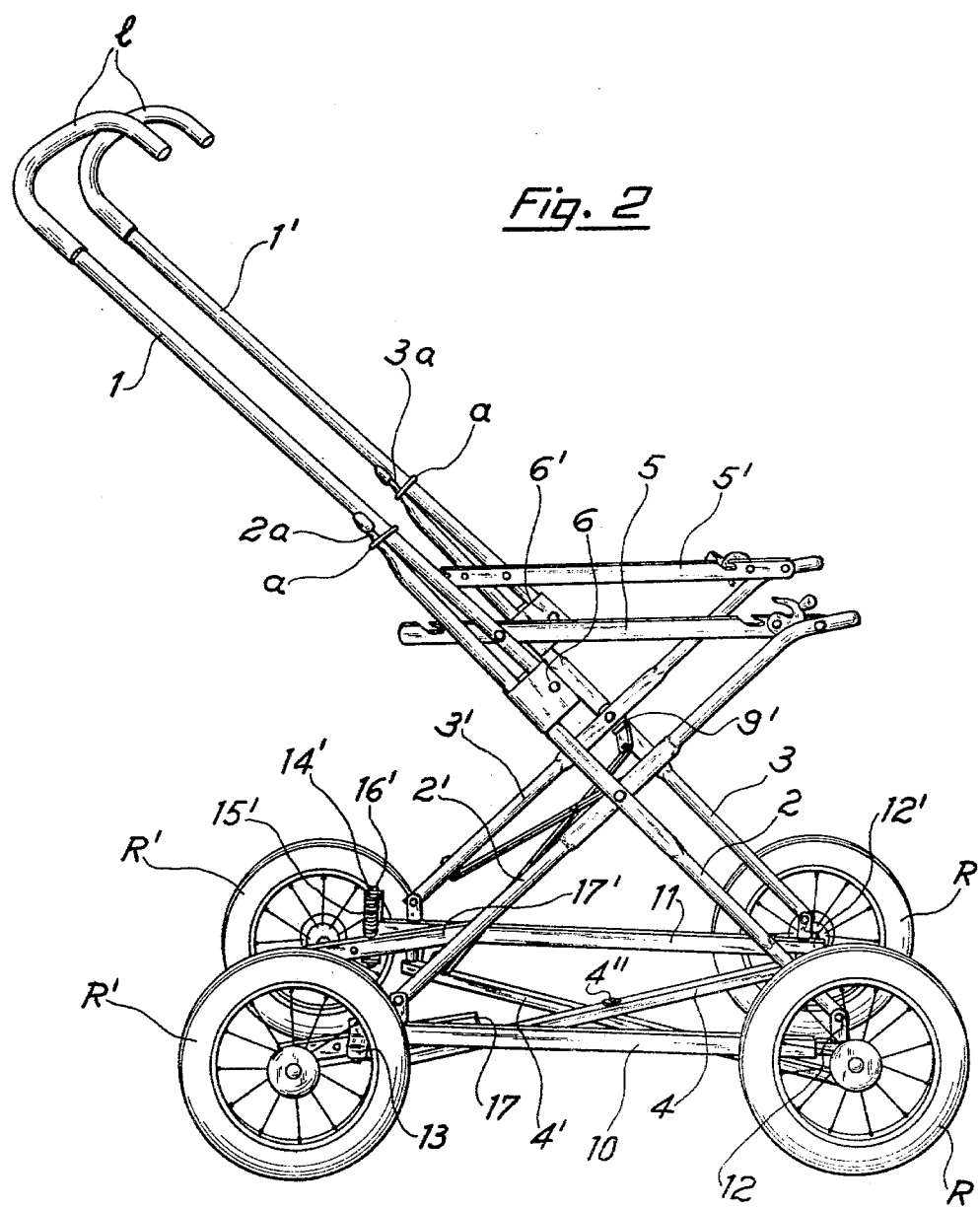
FIG. 2 is a side perspective view of the chassis of FIG. 1.
Figure 3:
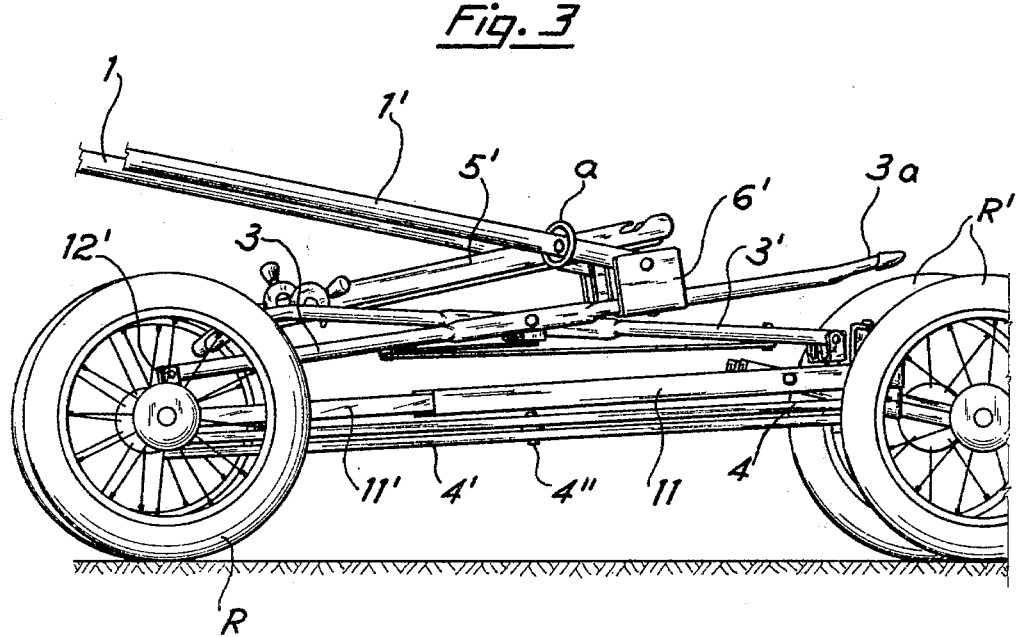
FIG. 3 is a side perspective view of the chassis in accordance with the invention; when in the folded position, that is to say in an elongated position reduced in width, easier to carry and to store, and finally
Figure 4:
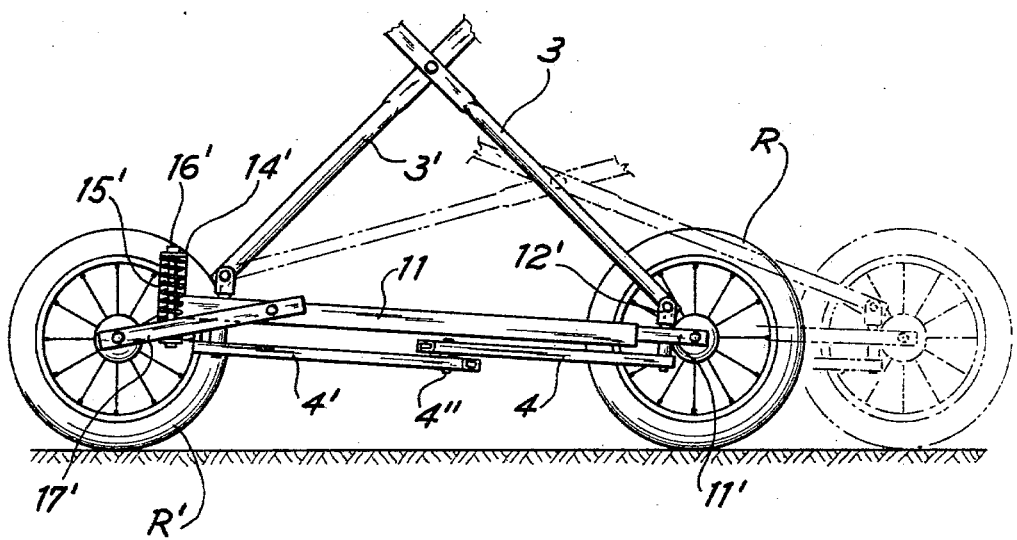
FIG. 4 is an inner side view of a chassis according to the invention showing—schematically the detail of a side member both in the extended and in the folded position.

Arms 1, 1' have at one end C-shaped sections, covered by handles, designated by reference letter "l", to allow a good grip of the perambulator. As best shown in FIGS. 2 and 3 the other ends of the arms 1,1'are hinged within U-shaped plates 6, 6' which enfold them, together with the top and rear parts of the side cross struts 2, 3.

The side cross struts 2, 3 are tube-shaped but have their central sections, facing each other, flattened for easier fixing.

As best shown in FIG. 1, the ends 2a and 3a of these side cross struts 2, 3 are also flattened into a cup-shape so that they fittingly receive and support arms 1, 1' in the working position, and are fixed thereto by means of movable rings a.

Because of this, once rings a are lifted, arms 1, 1' can be pivoted about their lower ends through an arc of 180° and placed in position parallel to the tubular side cross struts 2, 2', 3, 3'.

In turn, the base-cross strut 4,4' allows the folding of the structure not only in height but also in width; its arms are connected centrally by means of a pivot 4''.

A fourth rear cross strut consists of elements 7, 7' which are pivoted at 7''. Elements 7, 7' have lower ends respectively hinged directly to rear leg portions of side cross struts 2', 3' and the upper ends hinged to connecting rods 8, 8' which in turn are respectively hinged on pivots 2'' and 3'' by means of suitable L-shaped elements 9, 9'. These pivots 2'' and 3'' centrally join arms 2, 2' and 3, 3' of the side cross struts respectively.

The features which are characteristic of the present invention and provide the desired strengthening of the structure comprise essentially two side members consisting of tubes 10, 10' and 11, 11', having rectangular cross-section, capable of telescoping into each other, and precisely the inner ones 10', 11' into the outer ones 10, 11.

The ends of the inner tubes 10', 11' of the side members are fixed to the front ends of base cross struts 4, 4' by means of suitable U-shaped rods 12, 12' and to the lower ends of the front arms portions of the side cross struts 2, 3 and to the axles of front wheels R.

The ends of the outer tubes 10, 11 of the side members are fixed to the rear ends of arms of the base-cross struts 4,4' by means of other U-shaped rods 13, 13' and to the lower ends of rear arm portions of side cross struts 2', 3', and are connected by means of double-step rods 14, 14' and of vertical springs 15, 15' through which pins 16, 16' pass, to short tubes 17, 17'; in turn, short tubes 17, 17' are connected to the axles of rear wheels R'. The short tubes 17, 17' also have a rectangular cross-section and their forward end is directly fixed to the outer tubes 10, 11 of the side members, so that they are placed at an angle to the side members themselves, due to the height of parts 14, 14' which have a double step, and due to the related springs 15, 15' which clearly act as suspensions.

This solution, as has been said, in fact causes the folding of the chassis to be practically immedite. To fold the chassis, it is sufficient to lift rings a and to rotate arms 1, 1' forward. In this way, the various cross struts set their arms, instead of in an X-shaped layout, in a practically parallel position without being of hindrance one to the other and the inner tubes 10', 11' of the side members slide partly out of the related outer tubes 10, 11. Therefore, the chassis becomes reduced in width and elongated, thus being easier to carry and to store while its structure is absolutely firm.

The embodiment as drawn and described represents only one preferred embodiment of the invention.

Various modifications may be made thereto by an expert of the art, without leaving the scope of the invention idea.

I claim:

1. An improved cot frame for a collapsible perambulator of the type having a pair of opposed side cross struts, each of said pair of side cross struts including a front leg and a rear leg adjacently connected to said front leg so that, in use, the front leg extends diagonally downwardly toward the front of the perambulator and the rear leg extends diagonally downwardly toward the rear of the perambulator, pivot means interconnecting said rear leg and said adjacent front leg of each of said pair of said cross struts intermediate the ends thereof, an arm member pivotally connected to the upper end portion of each front leg, a base cross strut including crossing arm struts pivoted together intermediate to the ends thereof, means for pivoting the opposed ends of the respective crossing arm struts of said base cross strut to the lower end portion of a respective front leg and rear leg of said opposed side cross struts, the improvement comprising side elements interconnecting the side ends of the base cross strut at opposite sides of the frame whereby the structure is strengthened, each of said side elements including an outer tubular member and an inner tubular member telescopically received in said outer tubular member said inner tubular member having ends fixed to ends of said base cross strut, said outer tubular member having ends fixed to the opposite ends of said base cross strut so that the folding of the base cross strut causes the sliding of said inner tubular member relative to the outer tubular member of the said side members, and further comprising first U-shaped rod means for fixing the ends of said inner tubular member to the lower ends of said front legs of the side cross struts, second U-shaped rod means for fixing the opposite ends of said outer tubular members to the lower ends of said rear legs of the side cross struts so that the folding of the side cross struts causes the sliding of said inner tubular member relative to said outer tubular member of the side members.

2. An improved collapsible structure as defined in claim 1, wherein said telescopically associated elements consist of metal tubes of rectangular cross-sectional configuration.

3. An improved cot frame for a collapsible perambulator of the type hving a pair of opposed side cross struts, each of said pair of side cross struts including a front leg and a rear leg adjacently connected to said front leg so that, in use, the front leg extends diagonally toward the front of the perambulator and the rear leg extends diagonally downwardly toward the rear of the perambulator, pivot means interconnecting said rear leg and said adjacent front leg of each of said pair of side cross-struts intermediate the ends thereof, an arm member pivotally connected to the upper end portion of each front leg, a base cross strut including crossing arm struts pivoted together intermediate to the ends thereof, means for pivoting the opposed ends of the respective crossing arm struts of said base cross-strut to the lower end portion of a respective front leg and rear leg of said opposed side cross struts, the improvement comprising side elements interconnecting the side ends of the base cross strut at opposite sides of the frame whereby the structure is strengthened, each of said side elements including an outer tubular member and an inner tubular member telescopically received in said outer tubular member, said inner tubular member having ends fixed to ends of said base cross strut, said outer tubular member having ends fixed to the opposite ends of said base cross strut so that the folding of the base cross strut causes the sliding of said inner tubular member relative to the outer tubular member of the said side members, and further comprising a short tube having rectangular cross-section provided to the side of, and internally to, said side element, a double step-element means and a vertical spring, a pin disposed through said spring which acts as suspensions, for fixing the ends of said outer tubular member to said short tube, said short tube being operatively connected to join the axle of a rear wheel to said outer tubular member in an innermost point so that relative to the latter, said short tube takes on a slanting position.

4. An improved collapsible structure, as defined in claims 1 or 3, further comprising an axle operatively connected on the lower end of the respective front and rear legs, a wheel journaled on each axle, the ends of the inner tubular members bein fixedly connected to each axle of the front wheels, and the ends of said outer tubular members being fixedly connected to the rear wheels so that the frame is strengthened.

5. An improved collapsible structure, as defined in claim 1 or 3, further comprising L-shaped part means, and a rear cross strut having ends fixed to the crossing points of each of said pair of side cross struts by said L-shaped part means.

* * * * *